(12) United States Patent
Myers et al.

(10) Patent No.: US 7,968,007 B2
(45) Date of Patent: Jun. 28, 2011

(54) TUNGSTATE BASED CORROSION INHIBITORS

(75) Inventors: Craig W. Myers, Lisle, IL (US); Steven R. Hatch, Naperville, IL (US); Donald A. Johnson, Batavia, IL (US); Phillip E. Bureman, Olathe, KS (US)

(73) Assignee: Nalco Company, Naperville, IL (US)

( * ) Notice: Subject to any disclaimer, the term of this patent is extended or adjusted under 35 U.S.C. 154(b) by 205 days.

(21) Appl. No.: 12/141,512

(22) Filed: Jun. 18, 2008

(65) Prior Publication Data

US 2008/0289384 A1 Nov. 27, 2008

Related U.S. Application Data

(63) Continuation-in-part of application No. 11/113,742, filed on Apr. 25, 2005, now Pat. No. 7,402,263.

(51) Int. Cl.
*H01B 1/00* (2006.01)
*C04B 9/02* (2006.01)
*C05C 9/00* (2006.01)

(52) U.S. Cl. ......... 252/387; 106/14.12; 106/14.13; 106/14.21; 71/28; 71/29; 71/30

(58) Field of Classification Search ......... 252/500, 252/387; 106/14.12, 14.13, 14.21; 71/28–30
See application file for complete search history.

(56) References Cited

U.S. PATENT DOCUMENTS

| | | |
|---|---|---|
| 3,790,610 A | 2/1974 | Lum et al. |
| 4,289,634 A | 9/1981 | Lewis et al. |
| 4,409,121 A | 10/1983 | Latos et al. |
| 4,659,481 A | 4/1987 | Chen |
| 5,047,078 A | 9/1991 | Gill |
| 5,288,410 A | 2/1994 | Cuisia |
| 5,376,159 A | 12/1994 | Cunningham et al. |
| 6,007,772 A | 12/1999 | Green |
| 6,623,695 B2 | 9/2003 | Malchesky et al. |
| 2003/0230742 A1 | 12/2003 | Trahan et al. |
| 2006/0237684 A1 * | 10/2006 | Myers et al. ............ 252/70 |

FOREIGN PATENT DOCUMENTS

| | | |
|---|---|---|
| EP | 1 191 073 A | 3/2002 |
| RU | 2 048 461 C1 | 11/1995 |
| WO | 2008/013534 A | 1/2008 |

OTHER PUBLICATIONS

Cahoon, J. R., "Corrosion characteristics of mild steel in urea ammonium nitrate fertilizer solutions," *Corrosion*, Houston, 2002, vol. 58, No. 2, pp. 166-174.

Hartwick, D. et al., "Electron Microprobe Analysis of Zinc and Molybdate Films on Mild Steel Surfaces," IWC-91-43, 1991, pp. 328-335.

Hollander, O. & Geiger, G.E., "Development of a Corrosion Inhibitor for Low-Carbon Steel in Concentrated Solutions of Urea-Ammonium Nitrate Fertilizers," *Chemical Treatment, Materials Performance*, 2002, pp. 50-65.

Jabeera, B. et al., "The Synergistic Inhibitive Effect of Tungstate with Zinc Ions on the Corrosion of Iron in Aqueous Environments," *Anti-Corrosion Methods and Materials*, vol. 49, 2002, pp. 408-416.

Nguyen, D. T., "Corrosion of liquid fertilizers on metallic materials," American Chemical Society National Meeting, Sep. 1997.

Zhavoronkova et al., "Corrosion of materials in urea-ammonium mixtures," Cherepovets. Azotmotukovyi Zavod, Cherepovets, USSR, *Khimozatsiya Sel'skogo Khozyaistva*, 1989, vol. 6, pp. 48-49., with English abstract.

* cited by examiner

Primary Examiner — Mark Kopec
Assistant Examiner — Jaison P Thomas
(74) Attorney, Agent, or Firm — Edward O. Yonter; Michael B. Martin

(57) ABSTRACT

A trace amount of a tungstate added together with an orthophosphate and/or phosphonite is disclosed for inhibiting corrosion by a nitrogen fertilizer solution. In particular, an ammonium nitrate fertilizer solution is in contact with ferrous metal storage tanks, piping, and equipment surfaces. Tungstate added with an iron stabilizer including a dispersant polymer is also effective for inhibiting corrosion.

8 Claims, No Drawings

TUNGSTATE BASED CORROSION INHIBITORS

CROSS REFERENCE TO RELATED APPLICATION

This application is a continuation-in-part of U.S. patent application Ser. No. 11/113,742, filed on Apr. 25, 2005 now U.S. Pat. No. 7,402,263, entitled "TUNGSTATE BASED CORROSION INHIBITORS," which is incorporated by reference herein in its entirety.

TECHNICAL FIELD

This invention relates to tungstate-based corrosion inhibitors for nitrogen fertilizer solutions. More specifically, the invention relates to inhibiting corrosion caused by urea ammonium nitrate solutions. The invention has particular relevance to using tungstate based corrosion inhibitors at low concentration levels.

BACKGROUND

Nitrogen solutions represent an important class of fertilizers. A commercially popular nitrogen fertilizer solution is made from urea and ammonium nitrate, often referred to as UAN. The UAN does not need to be kept under pressure, and can be applied directly for agricultural purposes.

The production of UAN solutions is straightforward, comprising blending urea solution, ammonium nitrate solution and any additional water in a mixing tank, in either a batch or a continuous process. Ammonia is sometimes also added to adjust the pH of the resultant solution. Mixtures of ammonium nitrate and urea have much greater solubility as compared to that of either material alone. The UAN is typically manufactured with about 20% by weight water and (32% Total Nitrogen Content), but for field application is typically diluted with water to 28% Total Nitrogen Content. The economics of such solutions are relatively attractive in comparison to solids because evaporation is decreased and granulation, drying, and conditioning are not necessary.

One problem that has been persistent in the production, storage, transportation, and use of UAN has been that the UAN liquid is corrosive to carbon steel. Without adequate corrosion inhibition, UAN solutions in ferrous tanks or piping systems can become colored within a matter of days, usually orange or reddish, indicating iron corrosion. This problem in ammonium nitrate (AN) and UAN solutions has been the subject of several reported corrosion studies over the last 50 years. (Vreeland et al., 1956; Novak et al., 1984; and Cahoon, 2002). The behavior of UAN solutions and AN solutions have been found to be similar in these studies. However, the actual inhibitors tested are often listed as "proprietary compounds," and thus the studies are of limited value. The corrosive effect of AN and UAN on various metallurgies has also been reported. (Zavoronkova et al., 1989).

However, the actual corrosion of field equipment (e.g., storage tanks, ferrous metal piping, equipment surfaces, etc. such as that used during storage, transport, and other processing of AN and UAN materials) can be substantially more complicated than laboratory electrochemical studies may indicate. In particular, sludge that collects in low spots on the tank floor, such as the chine weld connecting the tank walls to the floor or along the lower plate of a lap weld, seems to be important in contributing to the pitting corrosion that is often observed in these areas. Sludge can be formed by corrosion product (rust) particles that drop off the tank walls to the bottom of the UAN storage vessel, creating these sludge deposits on the vessel bottom over time. It is therefore particularly useful for a corrosion inhibitor to be able to reduce the generation of particulate matter associated with even small amounts of corrosion in UAN storage and transportation vessels (e.g. rail cars).

In the past, several general types of corrosion inhibitors have been used in urea ammonium nitrate solutions. High levels (e.g., hundreds or thousands of mg/kg) of phosphate or polyphosphate salts were employed early on by the industry. This approach eventually fell into disfavor due to the production of precipitates of the phosphates with other ionic constituents such as iron, calcium, magnesium, etc. These precipitates lead to unfavorable deposits on the bottom of storage vessels (as noted above) as well as plugging of spray application devices.

Various types of filming inhibitors (a.k.a. "filmers"), in particular phosphated esters and the like, were the next generation of treatment technology (Hallander et al., 2002). Many different types of filmers have been employed, but these filmers typically have three drawbacks. First, due to their surfactant nature, they may contribute to undesirable foaming during loading/unloading of the UAN. Second, the hydrophobic character of the uncharged end of the molecule may lead to preferential absorption into floating oil layers that are often found on the top of UAN in storage. These oil layers are formed over time by small oil leaks from the compressors used in manufacturing the UAN raw materials. Third, the filmers may have difficulty penetrating existing sludge layers to inhibit under-deposit corrosion on a tank bottom.

The next generation of inhibitors was based on molybdate (Cunningham et al., 1994), which passivates the corroding metal surface by forming a surface complex with iron (Hartwick et al., 1991). In actual applications, molybdate has the advantage that it seems to give good penetration of existing sludge layers to inhibit under-deposit corrosion on tank bottoms. Molybdate has the additional advantage that it is a plant micronutrient. However, the cost of this type of treatment is currently unacceptable due to the recent steep rise in molybdate costs.

There thus exists a need for economical and efficient compositions and methods of preventing corrosion caused by UAN and AN solutions.

SUMMARY

Accordingly, in one aspect the present invention provides a method for inhibiting corrosion of ferrous metal surfaces exposed to nitrogen fertilizer solutions by adding an effective amount of tungstate to the nitrogen fertilizer solution. The method generally includes the steps of blending a corrosion inhibitor with a fertilizer solution containing urea, ammonium nitrate, a minor amount of water and an effective amount of tungstate, and contacting the metal surfaces with the resulting blend.

In another aspect, the present invention provides a method for inhibiting corrosion of a ferrous metal exposed to a nitrogen fertilizer solution by adding effective amounts of tungstate plus an iron stabilizer to maintain ferrous ions soluble and thereby prevent particulate iron oxide formation. The iron stabilizer preferably includes a dispersant polymer. Suitable dispersant polymers include polymers containing one or more of the following monomers: acrylic acid; acrylamide; t-butyl acrylamide; methacrylic acid; itaconic acid; maleic anhydride; 2-acrylamide-2-methylpropane sulfonic acid; styrene sulfonate; vinyl sulfonate; allyl glycidyl ether; allyl hydroxypropyl sulfonate ether; polyethylene glycol allyl ether; allyl sulfonate. In a preferred embodiment, the dispersant polymer is an acrylic acid homopolymer; an acrylic acid/acrylamide/acrylamido methane sulfonic acid terpolymer; or an acrylic acid/2-acrylamide-2-methylpropane sulfonic acid copolymer. In the most preferred embodiment the dispersant polymer is a 3:1 ratio acrylamide/acrylic acid copolymer.

In another aspect, the present invention provides a method for inhibiting corrosion of a ferrous metal exposed to a nitrogen fertilizer solution by adding effective amounts of tungstate, ortho-phosphate, phosphonate, and/or phosphonite, and an iron stabilizer to said fertilizer solution. The iron stabilizer preferably includes a dispersant polymer. Suitable dispersant polymers include those described herein.

In yet another aspect of the present invention a method for inhibiting the corrosion of a ferrous metal surface exposed to a nitrogen fertilizer solution comprising the step of adding an effective amount of tungstate, ortho-phosphate, phosphonate, and/or phosphonite, and an iron stabilizer compound to said nitrogen fertilizer solution. Again, the iron stabilizer preferably includes a dispersant polymer. Representative dispersant polymers are described herein.

It is an advantage of the invention to provide compositions and methods of effectively inhibiting corrosion by a nitrogen fertilizer solution in contact with ferrous metal surfaces during storage, transport, or other processing using trace amounts of tungstate.

It is another advantage of the invention to provide methods of inhibiting corrosion of ferrous metal surfaces caused by nitrogen fertilizer solutions containing an effective amount of tungstate that is non-foaming and can be made essentially free of precipitates.

Additional features and advantages are described herein, and will be apparent from, the following Detailed Description and Examples.

DETAILED DESCRIPTION

Throughout this patent application the following terms have the indicated meaning:

"Ferrous metal" means any iron-containing metal, such as carbon steel or alloy steel.

"Iron stabilizer" means a molecule that binds with the iron that is produced as corrosion takes place to prevent particulate iron oxide formation.

"Nitrogen fertilizer solution" means a fertilizer solution that at least includes ammonium nitrate.

"Phosphonate" includes compounds such as aminotris (methylene phosphonic acid), 1-hydroxyethylidene-1,1-diphosphonic acid, and hydroxyphosphono acetic acid. Additional examples may be found in U.S. Pat. No. 6,953,537 B2 to Trahan et al., entitled "Corrosion Inhibitors."

The present invention is generally applicable to urea-ammonium nitrate fertilizer solutions. The UAN preferably contains a minor amount of water (e.g., less than about 50 weight percent) but usually at least about 20 weight percent water is necessary to maintain solubility of the urea-ammonium nitrate mixture. The UAN preferably comprises generally from 20 up to 50 percent water, more preferably from 20 to 25 percent water by weight.

The corrosion inhibitor includes a tungstate salt formulation that is readily soluble in the nitrogen fertilizer solution or UAN at effective concentrations for inhibiting corrosion. The tungstate is non-foaming and is preferably rendered non-sludging through the use of the iron stabilizer and by avoiding very high ortho-phosphate levels in the formulation as these can lead to forming iron phosphate or other phosphate salt particles in the nitrogen fertilizer or UAN. As used herein, non-sludging refers to the general absence of sludge formation from the nitrogen fertilizer solution or UAN over an extended period of time (e.g., several months in a storage tank). The formation of minor amounts of sludge is permissible, but the sludge should not readily form so as to require frequent cleaning of the equipment. That is, sludge should not leave rings in sample bottles or tanks.

Similarly, the nitrogen fertilizer solution or UAN should not foam excessively, such as when it is transferred into or from a tank, or when sprayed in the field as a fertilizer application, such that the foaming substantially interferes with the operation. The formation of solid precipitates is similarly undesirable, and is excessive when the precipitate interferes with processing of the UAN m of tanks, plugging, for example when it settles at the bottom of tanks or plugs lines and/or equipment, and the like.

The tungstate is preferably an alkali metal tungstate such as sodium, potassium or lithium tungstate, or the like and is used in an amount that is effective to inhibit the corrosiveness of nitrogen fertilizer solution or UAN toward ferrous metal surfaces. Potassium and sodium tungstate are preferred. Sodium tungstate is especially preferred because it is readily available commercially, soluble in water and nitrogen fertilizer solution or UAN, and relatively non-hazardous under recommended use conditions.

Generally, at high concentrations of supplemental corrosion inhibitors, for instance ortho-phosphate at concentrations exceeding 70 ppm, the level of tungstate utilized may be reduced to between about 1 and about 5 ppm while still providing adequate corrosion protection. The use of tungstates in amounts less than about 1 ppm $WO_4$ by weight of the UAN solution is usually ineffective and there is generally no benefit to be gained by using an amount in excess of 50 ppm $WO_4$. Sodium tungstate is preferably used in an amount that gives more than about 1 and less than about 5 to 25 ppm $WO_4$ in the final fertilizer solution.

The corrosion inhibitor of the present invention is readily added to and blended with the nitrogen fertilizer solution or UAN using conventional blending techniques. For example, a tank with an agitator is all that may be needed, but the tungstate can also be introduced via a side stream into the UAN and allowing sufficient mixing to be generated by turbulence as the mixture flows through piping and other equipment. The tungstate can be added as a powder or granulated solid, but is preferably an aqueous solution, for example, from about 5 to about 38 percent by weight aqueous sodium tungstate. The tungstate can be added to the nitrogen fertilizer solution or UAN after the urea, ammonium nitrate, and any water are blended, or the tungstate can be added during the blending, or separately to the urea solution, the ammonium solution, and/or any additional water. The corrosion inhibitor can be added or blended on a batch or continuous basis.

Once the tungstate inhibitor is added to the fertilizer solution, it is effectively non-corrosive and can be stored, transported, shipped, or the like in ferrous metal equipment, such as tanks, piping, containers, application equipment, or the like. In particular, the inhibited nitrogen fertilizer solution or UAN can be diluted with water, generally just prior to field application as a nitrogen fertilizer for agricultural purposes.

As used herein, a nitrogen fertilizer solution or UAN solution is non-corrosive when the rate of corrosion of carbon steel in contact with the solution at ambient conditions is less than 250 microns per year (about 10 mils/year). The non-corrosive, dilute nitrogen fertilizer solution or UAN can thus be applied to cropland for agricultural purposes, with or without dilution and/or admixture with other common agricultural chemicals, using steel or other ferrous metal equipment, such as tanks, lines, pumps, spray nozzles, and the like.

The foregoing may be better understood by reference to the following examples, which are intended for illustrative purposes and are not intended to limit the scope of the invention.

Example 1

UAN from an actual UAN production facility with a starting pH of 7.9 was used. The UAN solution aliquots of 1.2 kg were placed in a round, flat-bottomed flask within a temperature-controlled water bath. Two blank solutions had no inhibitors. Two inhibited solutions had 11 ppm $WO_4$ each. The solutions were well mixed prior to testing. The flasks were equipped with a water-cooled condenser to prevent water loss from the UAN solution. The corrosion test temperature was 50° C. The corrosion test pH of 5.3 (measured using temperature-compensated double junction pH probe) was obtained after air purging the heated solutions with a ceramic air diffuser for 24 to 48 hours. The pH is controlled at the set point of 5.3 by adding additional ammonia gas to the solution as needed. This test pH produces a very corrosive solution suitable for rapid evaluation of UAN corrosion inhibitors.

The corrosion test metallurgical specimens were rectangular 1010 mild steel coupons (laser-cut and double-disk ground), each with a total surface area of 21.81 $cm^2$. The test specimens were not chemically pre-treated. One test specimen was placed inside each flask. Corrosion rates were measured by weight loss on the coupons at the end of the test period. The coupons were rinsed with alcohol and oven-dried at 105° C. prior to final weight determinations.

After 168 hours at the specified test conditions, two "blank" solutions without any added corrosion inhibitor had an average corrosion rate of 486 mils per year (mpy). Two solutions treated with 11 ppm $WO_4$ showed an average corrosion rate of 2.0 mpy. The resulting corrosion rate reduction was therefore 99.6%.

Example 2

The same basic testing protocol as for Example 1 was used. However, all flasks were treated with $Na_2WO_4$ to obtain 11 ppm $WO_4$ in each flask. Potential iron stabilizers (1-Hydroxyethylidene-1,1-Disphosphonic Acid (HEDP), Sodium Pyrophosphate, and Dispersant Polymer (3:1 Acrylamide to Acrylic Acid Copolymer)) were added for evaluation, and the solutions are well mixed prior to testing. Each test flask was run in duplicate, allow for evaluation of reproducibility of the results. Flasks were removed from the water bath once the solutions turn yellow, indicating that some iron has been generated via corrosion. The coupons were removed from the flasks. The solutions were allowed to stabilize at room temperature. Aliquots were then extracted from the flasks to measure both the soluble and total iron in the solutions. Soluble iron is defined as iron remaining in solution after passing said solution through a 0.45 micron filter. The iron test method was calorimetric analysis using the Ferrozine reagent method from Hach Inc., Loveland, Co.

Using the ratio of the soluble iron to the total iron in solution, the amount of insoluble iron was calculated for each solution. The results are shown below. The dispersant polymer is highly effective. The phosphonate (HEDP) is marginally effective at best relative to the blank. The polyphosphate (pyrophosphate) is not effective.

|  | Stabilizer Dose (mg/kg) | Insoluble Iron (%, Avg.) | Standard Deviation |
|---|---|---|---|
| Blank | 0 | 22% | 1% |
| HEDP | 10 | 18% | 2% |
| Pyrophosphate | 10 | 29% | 1% |
| Dispersant polymer | 10 | 0% | 4% |

Example 3

UAN from an actual UAN production facility with a starting pH of 7.9 could be used, as in Example 1. The UAN solution aliquots of 1.2 kg would be placed in a round, flat-bottomed flask within a temperature-controlled water bath. Two blank solutions would have no inhibitors and would be controls. Two inhibited solutions would have 70 ppm ortho-phosphate and two additional solutions would have 70 ppm ortho-phosphate (alternatively more or less ortho-phosphate could be used) and 1 ppm $WO_4$ each (alternatively up to about 5 ppm might be used). The solutions would be mixed well prior to testing. The flasks would be equipped with a water-cooled condenser to prevent water loss from the UAN solution. The corrosion test temperature would typically be maintained at about 50° C. The corrosion test pH of 5.3 (measured using temperature-compensated double junction pH probe) would be observed after air purging the heated solutions with a ceramic air diffuser for 24 to 48 hours. The pH would be controlled at the set point of 5.3 by adding additional ammonia gas to the solution as needed. This test pH produces a very corrosive solution suitable for rapid evaluation of UAN corrosion inhibitors.

The corrosion test metallurgical specimens would be rectangular 1010 mild steel coupons (laser-cut and double-disk ground), each with a total surface area of 21.81 $cm^2$, as in Example 1. The test specimens would not be chemically pre-treated. One test specimen would be placed inside each flask. Corrosion rates would be measured by weight loss on the coupons at the end of the test period. The coupons would be rinsed with alcohol and oven-dried at 105° C. prior to final weight determinations.

After 168 hours at the specified test conditions, two "blank" solutions without any added corrosion inhibitor would have an average corrosion rate of 486 mils per year (mpy). Two solutions treated with 70 ppm ortho-phosphate would show significantly less corrosion, and the two solutions having 70 ppm ortho-phosphate and 1 ppm $WO_4$ would show an unexpected substantial reduction in corrosion rate beyond that observed with the ortho-phosphate alone.

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:
1. A method for inhibiting corrosion of a ferrous metal surface exposed to a nitrogen fertilizer solution, the method comprising: adding to the nitrogen fertilizer solution from about 1 ppm to about 5 ppm of an alkali metal tungstate; an effective amount of ortho-phosphate, a phosphonate, and/or a phosphonite; and an effective amount of an iron stabilizer, the iron stabilizer being a dispersant polymer including an acrylic acid/acrylamide/acrylamido methane sulfonic acid terpolymer and/or a 3:1 ratio of acrylamide to acrylic acid copolymer.

2. The method of claim 1, wherein said nitrogen fertilizer solution is a urea ammonium nitrate solution.

3. The method of claim 1, wherein the alkali metal tungstate is selected from the group consisting of: sodium tungstate; potassium tungstate; lithium tungstate; and combinations thereof.

4. The method of claim 1, wherein the alkali metal tungstate, the ortho-phosphate, the phosphonate, and/or the phosphonite, and the optional iron stabilizer are added separately to the nitrogen fertilizer solution.

5. The method of claim 1, including continuously adding to the nitrogen fertilizer solution the alkali metal tungstate, the ortho-phosphate, the phosphonate, and/or the phosphonite, and the iron stabilizer.

6. The method of claim 1, including adding on a batch basis to the nitrogen fertilizer solution the alkali metal tungstate, the ortho-phosphate, phosphonate, and/or the phosphonite, and the optional iron stabilizer.

7. The method of claim 1, wherein the alkali metal tungstate is a powder or granulated solid.

8. The method of claim 1, wherein the alkali metal tungstate is an aqueous solution from 5 to 38 weight percent.

* * * * *